United States Patent
Yoshimura

(10) Patent No.: US 7,464,355 B2
(45) Date of Patent: Dec. 9, 2008

(54) TIMING ANALYZING METHOD AND APPARATUS FOR SEMICONDUCTOR INTEGRATED CIRCUIT

(75) Inventor: Terumi Yoshimura, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 11/540,645

(22) Filed: Oct. 2, 2006

(65) Prior Publication Data

US 2007/0234254 A1 Oct. 4, 2007

(30) Foreign Application Priority Data

Mar. 31, 2006 (JP) ............................. 2006-099249

(51) Int. Cl.
*G06F 17/50* (2006.01)
(52) U.S. Cl. .................................. 716/6; 716/4; 716/5
(58) Field of Classification Search ........................ None
See application file for complete search history.

(56) References Cited

U.S. PATENT DOCUMENTS

| | | | | |
|---|---|---|---|---|
| 4,924,430 A * | 5/1990 | Zasio et al. | ..................... | 716/6 |
| 6,389,381 B1 * | 5/2002 | Isoda et al. | ..................... | 703/19 |
| 6,665,847 B1 * | 12/2003 | Maheshwari | ..................... | 716/5 |
| 7,222,319 B2 * | 5/2007 | Yonezawa | ..................... | 716/6 |
| 7,239,997 B2 * | 7/2007 | Yonezawa | ..................... | 703/19 |
| 7,299,438 B2 * | 11/2007 | Hosono | ..................... | 716/6 |
| 2006/0152088 A1 * | 7/2006 | Kimata | ..................... | 307/117 |
| 2006/0225014 A1 * | 10/2006 | Hosono | ..................... | 716/6 |
| 2007/0113132 A1 * | 5/2007 | Hosono | ..................... | 714/731 |

FOREIGN PATENT DOCUMENTS

| | | |
|---|---|---|
| JP | 2000-40098 | 2/2000 |
| JP | 2003-243509 | 8/2003 |
| JP | 2005-141434 | 6/2005 |

\* cited by examiner

*Primary Examiner*—Leigh Marie Garbowski
(74) *Attorney, Agent, or Firm*—Staas & Halsey LLP

(57) ABSTRACT

A method for analyzing timing in a semiconductor integrated circuit device with multi-corner conditions including a best-case corner condition and a worst-case corner condition. The best-case corner condition and the worst-case corner condition each include a temperature condition, with each temperature condition being a high temperature condition or a low temperature condition. The method includes storing in a temperature characteristic coefficient table a temperature characteristic coefficient for each of temperature-reversed corner conditions that are generated by selectively reversing the temperature conditions of the best-case corner condition and the worst-case corner condition, and performing timing analysis under said temperature-reversed corner conditions based on a gate delay and net delay calculated under the best-case corner condition and the worst-case corner condition and the temperature characteristic coefficient.

13 Claims, 8 Drawing Sheets

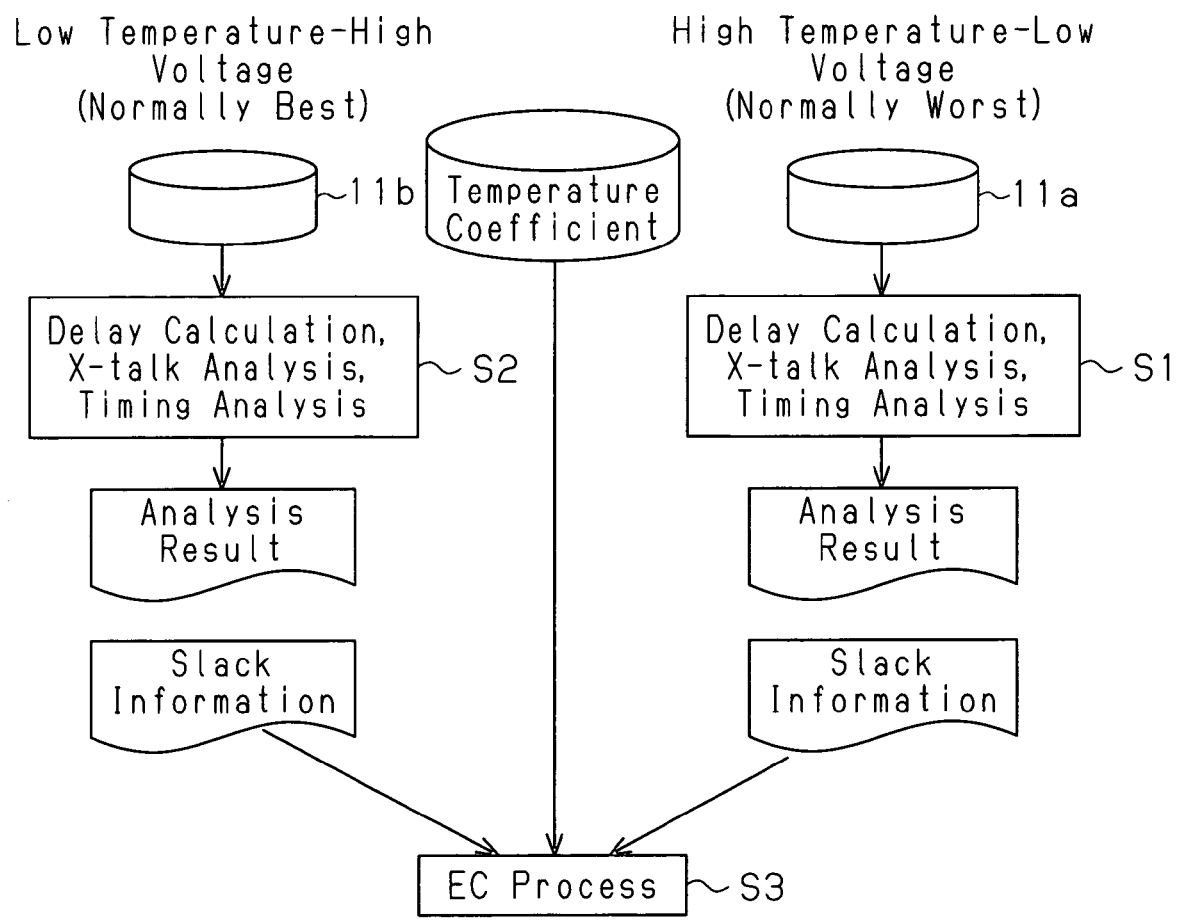

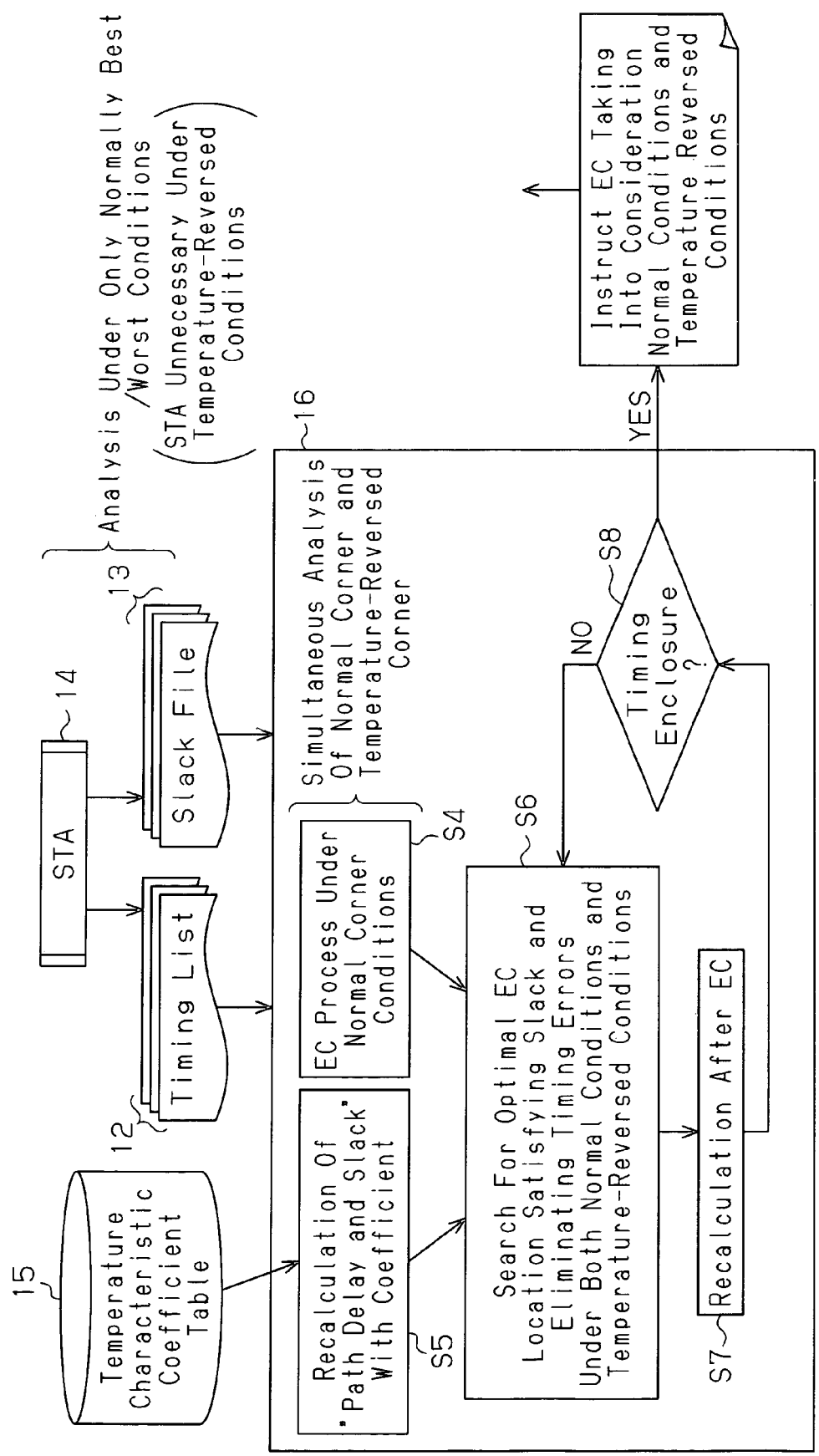

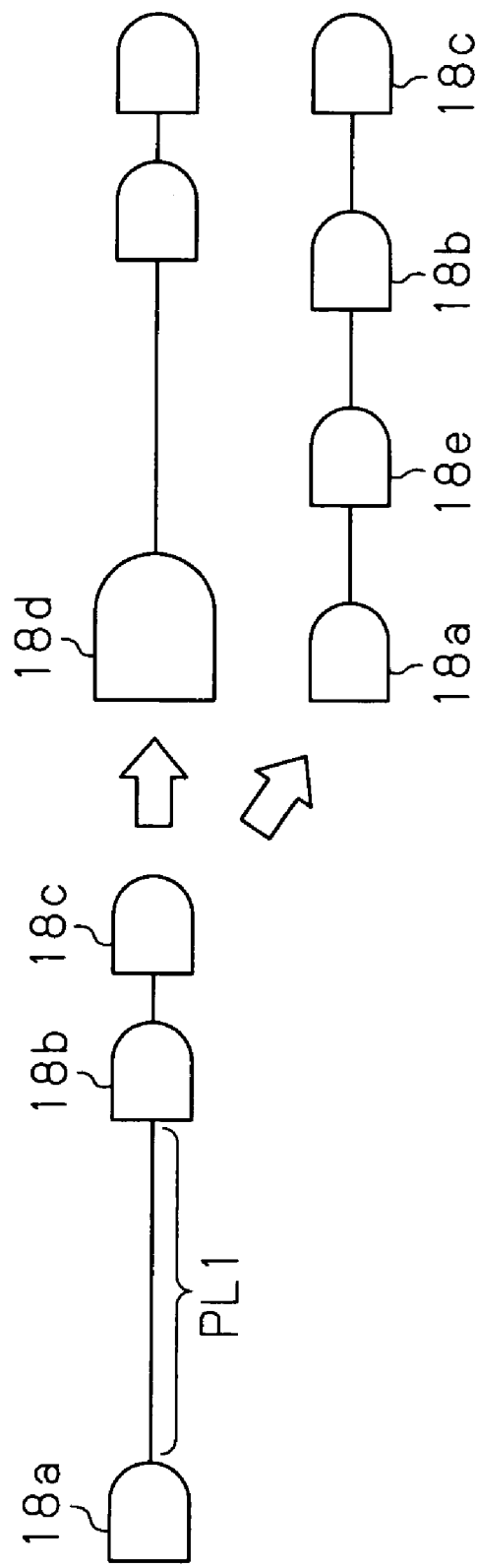
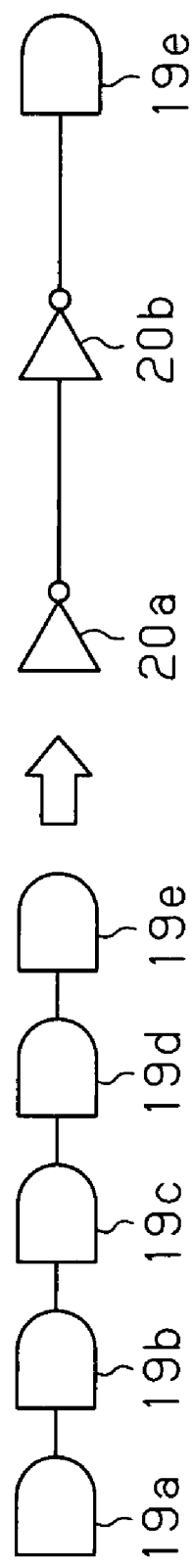
Fig.8A
Fig.8B

TIMING ANALYZING METHOD AND APPARATUS FOR SEMICONDUCTOR INTEGRATED CIRCUIT

CROSS-REFERENCE TO RELATED APPLICATIONS

This application is based upon and claims the benefit of priority from prior Japanese Patent Application No. 2006-099249, filed on Mar. 31, 2006, the entire contents of which are incorporated herein by reference.

BACKGROUND OF THE INVENTION

The present invention relates to a timing analyzing method and apparatus for a semiconductor integrated circuit.

When a semiconductor integrated circuit is designed, timing analysis is performed taking into consideration gate delay, which is caused by cells forming the semiconductor integrated circuit, and net delay, which is caused by wiring (conductive paths) connecting the cells. The layout of the semiconductor integrated circuit is corrected based on the timing analysis results. The gate delay changes in accordance with the power supply voltage and the ambient temperature. The net delay changes in accordance with the ambient temperature. Thus, the timing analysis and layout correction must be performed taking into consideration the parameters of the power supply voltage and the ambient temperature.

The operation delay time of a semiconductor integrated circuit changes in accordance with the power supply voltage, the ambient temperature, and process conditions. Process conditions result from changes in the delay time caused by differences in a semiconductor manufacturing process. A process having a long delay time is referred to as a slow process, and a process having a short delay time is referred to as a fast process.

Among the various combinations of the power supply voltage, the ambient voltage, and the process conditions, there are two extreme conditions, which are referred to as the worst-case corner condition and the best-case corner condition. The worst-case corner condition is normally the harshest condition from the viewpoint of timing error occurrences caused by changes in the operation delay time. The worst-case corner condition is referred to as a first corner condition and is the combination of high temperature (upper limit temperature), low voltage (lower limit voltage), and slow process. The best-case corner condition is referred to as a second corner condition and is the combination of low temperature (lower limit temperature), high voltage (upper limit voltage), and fast process.

However, the ratio of the gate delay and the wire delay (net delay) may differ between a clock path (transfer path of clock signal) and a data path (transfer path of data signal). In this case, the temperature characteristics of the gate delay differ from the temperature characteristics of the net delay. Thus, the two corner conditions may not be critical conditions.

The following table shows an example of the changing rate in the net delay and the gate delay resulting from temperature changes.

TABLE 1

| | Increasing Rate Under Low Temperature, High Voltage Conditions | |
|---|---|---|
| | Net Delay | Gate Delay |
| Low Temperature, High Voltage | 1.0 | 1.0 |
| High Temperature, High Voltage | about 1.62 (1.625) | about 1.27 (1.254) |

For example, when the net delay and gate delay of a signal path under a low temperature and high voltage is 1.0, the net delay under a high temperature and high voltage is about 1.62 times greater and the gate delay is 1.27 times greater. In other words, the increasing rte of the delay time caused by a temperature rise is greater in the net delay.

Therefore, in each signal path of a semiconductor integrated circuit, the two corner conditions described above may not be critical conditions due to the difference in occupying rate of the net delay and the gate delay.

FIG. 1 shows an example of a data path and a clock path in a semiconductor integrated circuit. In FIG. 1, data path dp transmits a data signal to a flip-flop circuit 2b via a plurality of buffer circuits 1 and a flip-flop circuit 2a. A clock path cp transmits a clock signal to a flip-flop circuit 2b via a plurality of buffer circuits 3.

Under the second corner condition (low temperature, high voltage, and fast process), a margin analysis was conducted on the delay time of the data path dp, the delay time of the clock path cp, and the hold time of the flip-flop circuit 2b. The results are shown by the following equations.

Data path delay=Net delay (221.5 ps)+Gate delay (1353.8 ps)=1575.3 ps

Net delay ratio=221.5 ps/1575.3 ps=0.14

Clock path delay=Net delay (689.3 ps)+Gate delay (782.6 ps)=1471.9 ps

Net delay ratio=689.3 ps/1471.9 ps=0.47

Hold Margin=Data path delay−Clock path delay−Hold=1575.3 ps−1471.9 ps−62.0 ps=41.4 ps   (equation 1)

In the analysis results, the data path delay is the total delay time of the data path dp, or the sum of the net delay and gate delay in the data path dp, and is 1575.3 ps. The net delay ratio is the ratio of the net delay relative to the total delay time. The net delay ratio of the data path dp is 0.14.

The clock path delay is the total delay time of the clock path cp, or the sum of the net delay and gate delay in the clock path cp, and is 1471.9 ps. The net delay ratio of the clock path cp is 0.47.

The hold margin is the margin relative to the hold time Hold required by the flip-flop circuit 2b and is 41.4 ps.

Accordingly, under the first corner condition, a hold margin having a positive value is ensured. Thus, timing errors do not occur.

Timing analysis was conducted under the second corner condition (high temperature, high voltage, and fast process) in which the temperature was changed to a high temperature. The results are shown by the following equations.

Data path delay=Net delay (358.7 ps)+Gate delay (1729.0 ps)=2087.7 ps (1.33 times longer)

Clock path delay=Net delay (1116.1 ps)+Gate delay (986.7 ps)=2102.8 ps (1.43 times longer)

Hold Margin=Data path delay−Clock path delay−Hold=2087.7 ps−2102.8 ps−82.0 ps=−97.1 ps   (equation 2)

In this analysis result, the net delay and gate delay are obtained by multiplying the net delay and gate delay under the first corner condition by the increasing rate shown in table 1. The hold margin of −97.1 is obtained from the data path delay and the clock path delay. This indicates a timing error.

As described above, even if the timing analysis is performed under the first and second corner conditions, the detection of a timing error cannot be ensured. Therefore, a multi-corner timing analysis is performed. In addition to the first and second corner conditions, the multi-corner timing analysis uses a third corner condition, which is a combination of high temperature, high voltage, and fast process, and a fourth corner condition, which is a combination of low temperature, low voltage, and slow process.

FIG. 2 shows a multi-corner timing analysis method of the prior art. Four libraries 4a to 4d store delay information including the net delay and gate delay of each cell under the first to fourth corner conditions.

A delay calculation, crosstalk (X-talk) analysis, and timing analysis are performed under each of the corner conditions. Based on the analysis result and slack information, a layout correction process, or timing engineering change (EC) process, is performed. The slack information indicates a set up time margin when increasing the data bus delay time to ensure the hold time of the flip-flop circuit.

FIGS. 3A and 3B show specific examples of the above timing analysis and layout correction process. In the circuit of FIG. 3A, for example, under the second corner condition (low temperature, high voltage, and fast process), the net delay of the data path dp is 16 ps, the gate delay of the data path dp is 70 ps, the slack time of the flip-flop circuit 5 is 5 ps, the standard hold timing value is 30 ps, the net delay of the clock path cp is 30 ps, and the gate delay of the clock path cp is 20 ps. In this case, the hold margin of the flip-flop circuit 5 is obtained from the following equation.

$$\text{Hold Margin} = 86 \text{ ps } (70+16) - 50 \text{ ps } (20+30) - 30 \text{ ps} = 6 \text{ ps} \quad \text{(equation 3)}$$

In this case, a hold margin of 6 ps is obtained. Thus, a timing error does not occur.

In the circuit of FIG. 3A, for example, under the third corner condition (high temperature, high voltage, and fast process), which is obtained by changing the temperature to a high temperature in the second corner condition (low temperature, high voltage, and fast process), the net delay of the data path dp is 25.6 ps, the gate delay of the data path dp is 77 ps, the slack time of the flip-flop circuit 5 is 11 ps, the standard hold timing value is 35 ps, the net delay of the clock path cp is 48 ps, and the gate delay of the clock path cp is 22 ps. The hold margin of the flip-flop circuit 5 is obtained from the following equation.

$$\text{Hold Margin} = 102.6 \text{ ps} - 70 \text{ ps} - 35 \text{ ps} = -2.4 \text{ ps} \quad \text{(equation 4)}$$

In this case, the hold margin is insufficient by −2.4. This indicates a timing error.

To solve the timing error under the third condition, as shown in FIG. 3B, a buffer circuit 6 is added to the data path dp to increase the delay time of the data path dp. More specifically, the slack time of the flip-flop circuit has a margin of 11 ps. Thus, the buffer circuit 6 having a gate delay of 11 ps is added to the data path dp.

The addition of the buffer circuit 6 increases the gate delay of the data path dp from 77 ps to 88 ps. The slack time becomes zero, and a hold margin of 8.6 ps is obtained for the flip-flop circuit 5 as shown by the following equation. Thus, a timing error does not occur.

$$\text{Hold Margin} = 113.6 \text{ ps} - 70 \text{ ps} - 35 \text{ ps} = 8.6 \text{ ps} \quad \text{(equation 5)}$$

However, the addition of the buffer circuit 6 increases the gate delay from 70 ps to 81 ps also under the second corner condition. Thus, the slack time becomes insufficient, and a timing error occurs.

In this manner, when a layout correction is performed to obtain a hold margin that does not cause a timing error under any one of the corner conditions, a timing error may occur under other corner conditions.

SUMMARY OF THE INVENTION

As described above, in the multi-corner timing analysis method using the first to fourth corner conditions, the time required for analysis increases as the number of corner conditions increases. Further, when layout correction is performed to eliminate a timing error under a corner condition, a timing error occurs under other corner conditions. In this manner, the timing analysis and layout correction under multi-corner conditions results in inefficient iteration. Thus, the elimination of a timing error is burdensome.

Japanese Laid-Open Patent Publication No. 2005-141434 describes a system for performing timing analysis that takes into consideration the combination of corner conditions by obtaining a delay change coefficient of which index is the delay between a clock path and a data path to generate a pseudo-worst timing from the delay change coefficient.

Japanese Laid-Open Patent Publication No. 2000-40098 describes a designing method for decreasing a margin and the error of a minimum delay value and maximum delay value by using a dependency coefficient under the best-case corner condition and the worst-case corner condition in each cell for design subjects such as the power supply voltage, temperature, and process.

Japanese Laid-Open Patent Publication No. 2003-243509 describes a designing method for optimizing the margin by determining the margin in accordance with the layout of the semiconductor integrated circuit.

The present invention addresses the reduction of timing analysis time. The present invention particularly addresses the completion of timing error elimination and layout correction within a short period of time.

One aspect of the present invention is a method for analyzing timing in a semiconductor integrated circuit device with multi-corner conditions including a best-case corner condition and a worst-case corner condition. The best-case corner condition and the worst-case corner condition each include a temperature condition, with each temperature condition being a high temperature condition or a low temperature condition. The method includes storing in a temperature characteristic coefficient table a temperature characteristic coefficient for each of temperature-reversed corner conditions that are generated by selectively reversing the temperature conditions of the best-case corner condition and the worst-case corner condition, and performing timing analysis under said temperature-reversed corner conditions based on a gate delay and net delay, which are calculated under the best-case corner condition and the worst-case corner condition, and the temperature characteristic coefficient.

Another aspect of the present invention is a method for analyzing timing in a semiconductor integrated circuit device with multi-corner conditions including a first corner condition, which is a combination of a high temperature condition, a low voltage condition, and a slow process condition, and a second corner condition, which is a combination of a low temperature condition, a high temperature condition, and a fast process condition. The method includes selectively reversing the temperature condition of the first corner condition to generate a fourth corner condition, which is a combination of the low temperature condition, the low voltage condition, and the slow process condition. The method further includes selectively reversing the temperature condition of the second corner condition to generate a third corner condition, which is a combination of the high temperature condition, the high voltage condition, and the fast process condition. The method also includes storing a temperature characteristic coefficient for the fourth corner condition and a temperature characteristic coefficient for the third corner condition in a temperature characteristic coefficient table, performing timing analysis under the first corner condition and the second corner condition to calculate a gate delay and net delay under the first corner condition and a gate delay and net delay under the second corner condition, and performing timing analysis under the third corner condition and the fourth corner condition based on the gate delay and net delay in the first corner condition, the gate delay and net delay in the second corner condition, and the temperature characteristic coefficients stored in the temperature characteristic coefficient table.

A further aspect of the present invention is an apparatus for analyzing timing in a semiconductor integrated circuit device with multi-corner conditions including a best-case corner condition and a worst-case corner condition. The best-case corner condition and the worst-case corner condition each include a temperature condition, with each temperature condition being a high temperature condition or a low temperature condition. The apparatus includes a timing list storing a delay characteristic of cells and conductive paths in the semiconductor integrated circuit. A slack file stores slack time of the cell. A temperature characteristic coefficient table stores a temperature characteristic coefficient for each of temperature-reversed corner conditions generated by selectively reversing the temperature conditions of the best-case corner condition and the worst-case corner condition. An automatic timing engineering change device performs timing analysis under said temperature-reversed corner conditions based on a gate delay and net delay, which are calculated under the best-case corner condition and the worst-case corner condition, and the temperature characteristic coefficient.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a flowchart illustrating a timing analysis method according to a preferred embodiment of the present invention;

FIG. 5 is a block diagram of a timing analysis device of the preferred embodiment;

FIGS. 8A and 8B are block circuit diagrams illustrating a layout correction method.

DETAILED DESCRIPTION OF THE PREFERRED EMBODIMENT

Figure 1:
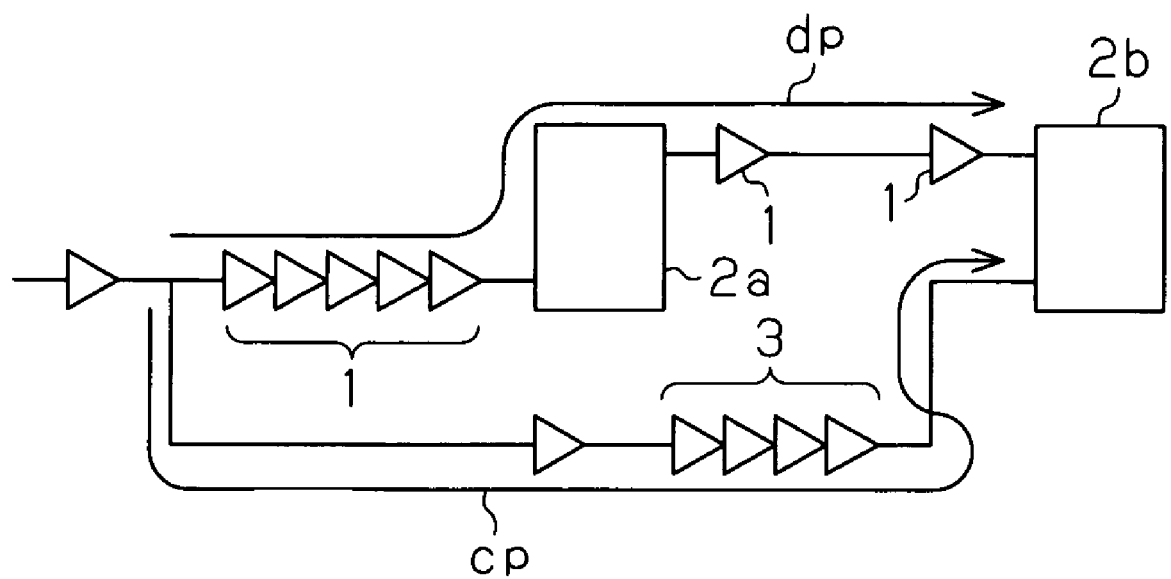
FIG. 1 is a block circuit diagram illustrating a timing analysis method of the prior art.
Figure 2:
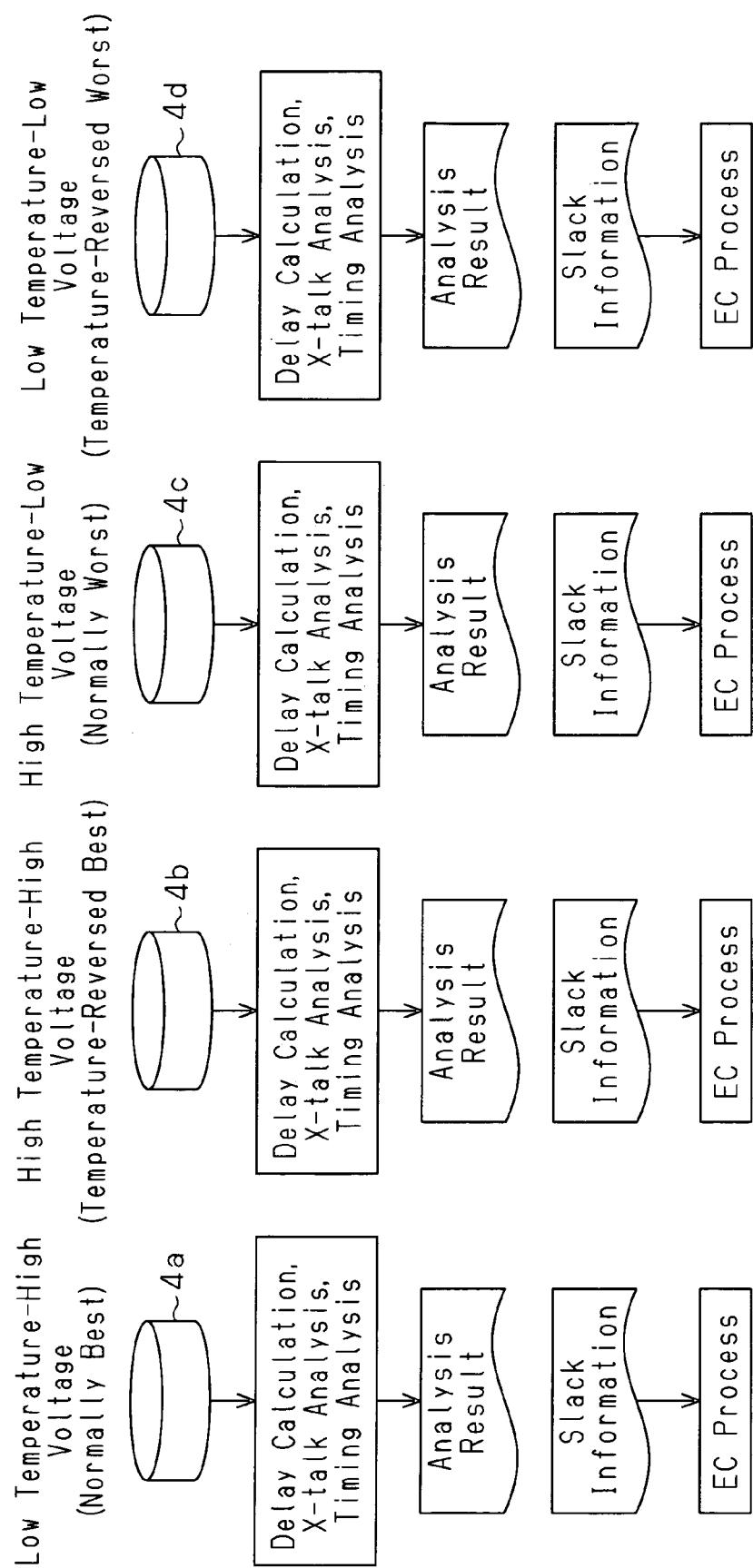
FIG. 2 is a flowchart illustrating the timing analysis method of the prior art.

A preferred embodiment of the present invention will now be discussed with reference to the drawings. FIG. 4 is a flowchart illustrating a timing correction method and layout correction method according to the preferred embodiment. A library 11a stores delay information of gate delay for each cell and net delay under the worst-case corner condition, or the first corner condition, which is a combination of high temperature (upper limit temperature), low voltage (lower limit voltage), and slow process. A library 11b stores delay information of gate delay for each cell and net delay under the best-case corner condition, or the second corner condition, which is a combination of low temperature (lower limit temperature), high voltage (upper limit voltage), and fast process.

Under each corner condition, delay calculation, crosstalk (X-talk) analysis, and timing analysis are performed (steps S1 and S2). Based on the analysis results and the slack information, an EC process is performed (step S3). The slack information indicates a set up time margin when increasing the data bus delay time to ensure the hold time of a flip-flop circuit.

In step S3, an automatic EC device 16 calculates a hold margin using a temperature characteristic coefficient corresponding to each of corner conditions that are generated by selectively reversing the temperature in the first and second corner conditions, that is, by changing the temperatures of the first and second corner conditions to the opposing values (i.e., from the upper limit temperature to the lower limit temperature or from the lower limit temperature to the upper limit temperature) without changing the voltage and process parameters. This step enables layout correction in which a timing error does not occur.

An analysis apparatus for performing timing analysis and layout correction and the operation of the analysis device will now be discussed with reference to FIG. 5.

A static timing analyzer (STA) tool 14 generates a timing list 12 and a slack file 13.

The increasing rate of temperature coefficients for third and fourth corner conditions with respect to the temperature coefficients of the first and second corner conditions is stored beforehand as a temperature characteristic coefficient in a temperature characteristic coefficient table 15. The third corner condition includes high temperature, high voltage, and fast process. The fourth corner condition includes low temperature, low voltage, and slow process.

Figure 6:
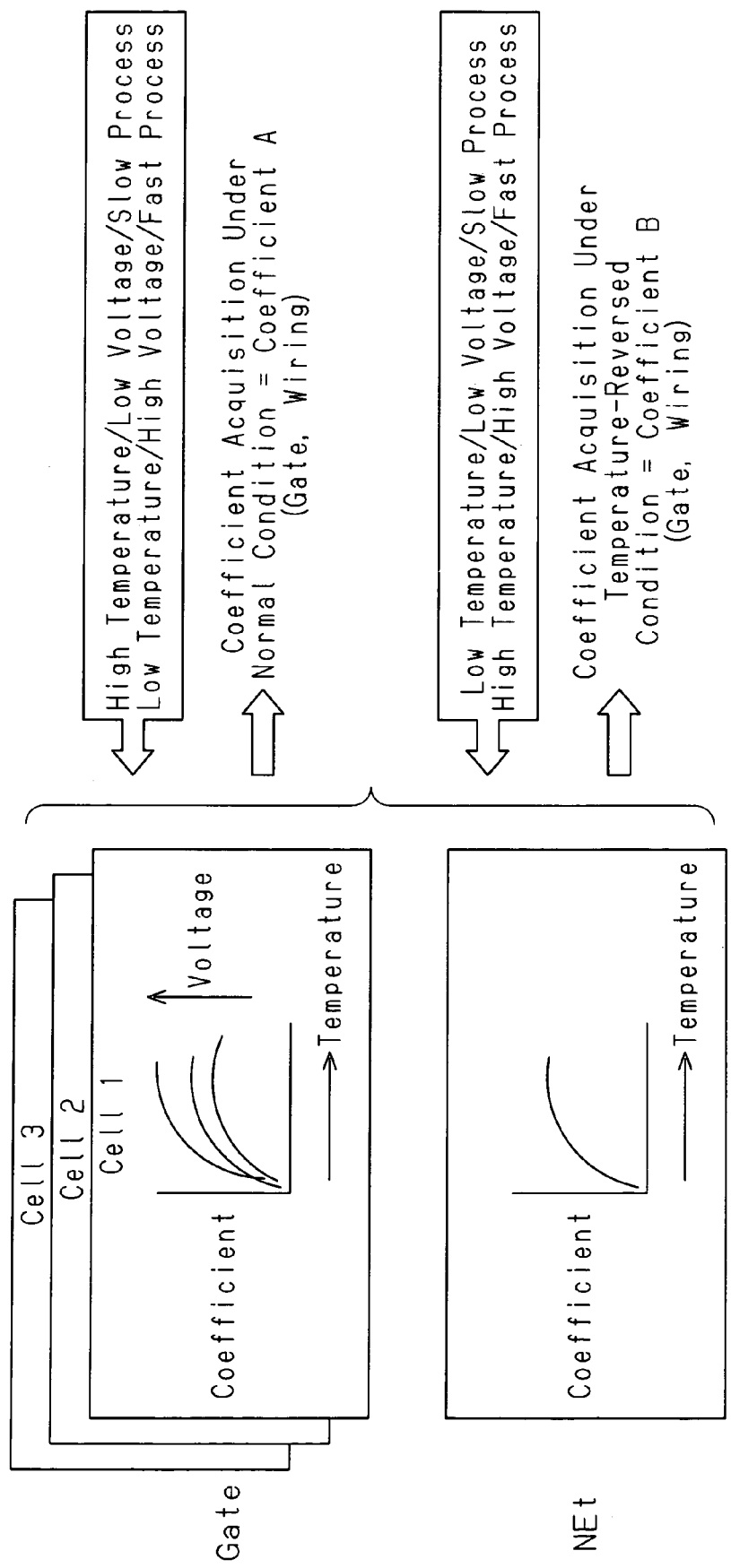
FIG. 6 is a schematic diagram illustrating the generation of the temperature characteristic coefficient.

Referring to FIG. 6, the gate delay of each cell forming a semiconductor integrated cell relates to a coefficient, the parameters of which are the temperature and voltage. The coefficient differs between cells. In the preferred embodiment, coefficient a of the gate delay under the first corner condition is calculated. Coefficient b of the gate delay under the fourth corner condition, which is generated by selectively reversing the temperature in the first corner condition, is calculated. Then, ratio b/a is calculated. The ratio is the coefficient increasing rate of the fourth corner condition with respect to the first corner coefficient. The increasing rate is stored in the temperature characteristic coefficient table 15 as the temperature characteristic coefficient. In the same manner, the temperature characteristic coefficient of the net delay under the third corner condition with respect to the second corner condition is stored in the temperature characteristic coefficient table 15.

The automatic EC device 16 performs steps S4 to S8 based on the timing list 12, the slack file 13, and the temperature characteristic coefficient table 15.

In step S4, the automatic EC device 16 performs timing analysis under the first and second corner conditions, that is, under normal corner conditions. In step S5, the automatic EC device 16 uses the temperature characteristic coefficient stored in the temperature characteristic coefficient table 15 to perform timing analysis corresponding to the third and fourth corner conditions. In one example, the automatic EC device 16 uses the temperature characteristic coefficient to calculate a hold margin under the third and fourth corner conditions from the following equation.

$$\text{Hold Margin} = \{kg \times \Sigma DGi + kl \times \Sigma DLi\} - \{kg \times \Sigma CGj + kl \times \Sigma CLj\} - \text{Thold} \times kt \quad \text{(equation 6)}$$

In the equation, kg, kl, and kt are the temperature characteristic coefficients stored in the temperature characteristic coefficient table 15. Further, kg is the temperature characteristic coefficient of the gate delay, kl is the temperature characteristic coefficient of the net delay, and kt is the temperature characteristic coefficient of the standard value Thold of the hold time. In the equation, $\Sigma$CGi is the total sum of the gate delay in the data path dp, $\Sigma$CGj is the total sum of the gate delay in the clock path cp, $\Sigma$CLi is the total sum of the net delay in the data path dp, and $\Sigma$CLj is the total sum of the net delay in the clock path cp.

In step S6, the automatic EC device 16 searches for a layout that does not cause a timing error under any one of the first to fourth corner conditions from the analysis results of step S4 and step S5.

In step S7, the automatic EC device 16 performs timing analysis based on the corrected layout. In step S8, the automatic EC device 16 determines whether or not a timing error is occurring. If a timing error is occurring again, steps S6 to S8 are repeated. If a timing error is not occurring in step S8, the processing proceeds to the next step.

Figure 3A:
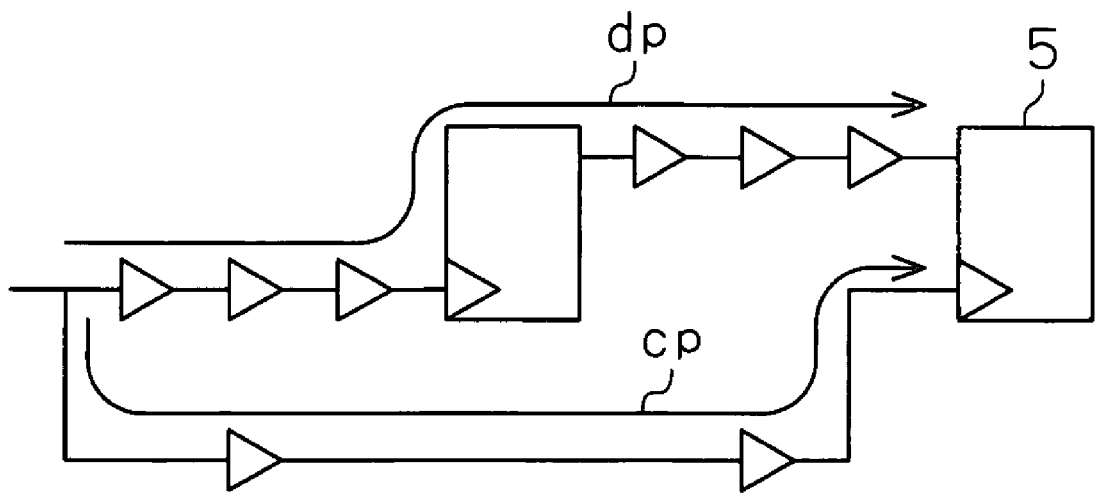
FIGS. 3A and 3B are block circuit diagrams illustrating the timing analysis method of the prior art.
Figure 3B:
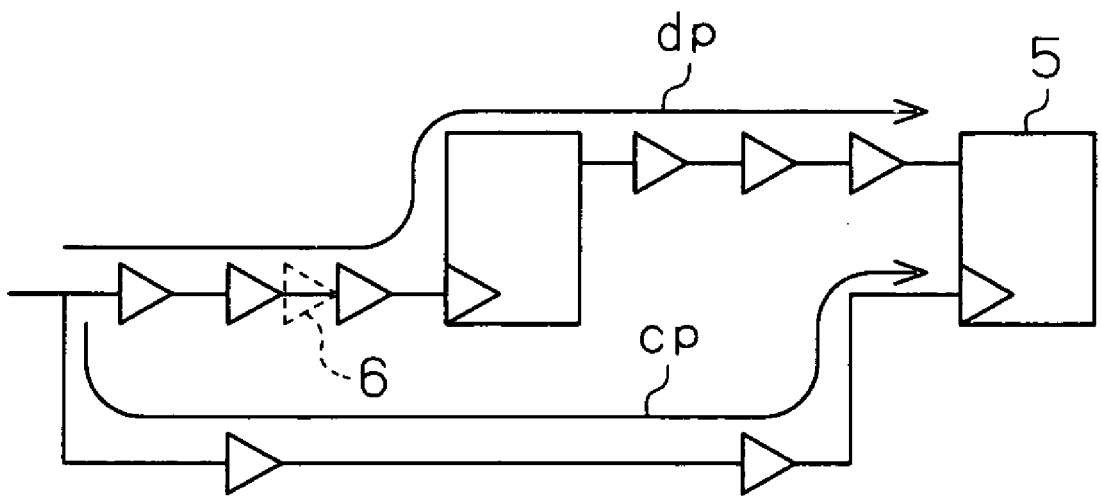

An example of the timing analysis and layout correction performed in step S6 will now be described with reference to FIGS. 7A and 7B. The corner conditions for analysis and correction are the same in the example of FIGS. 7A and 7B and the prior art example of FIGS. 3A and 3B.

Figure 7A:
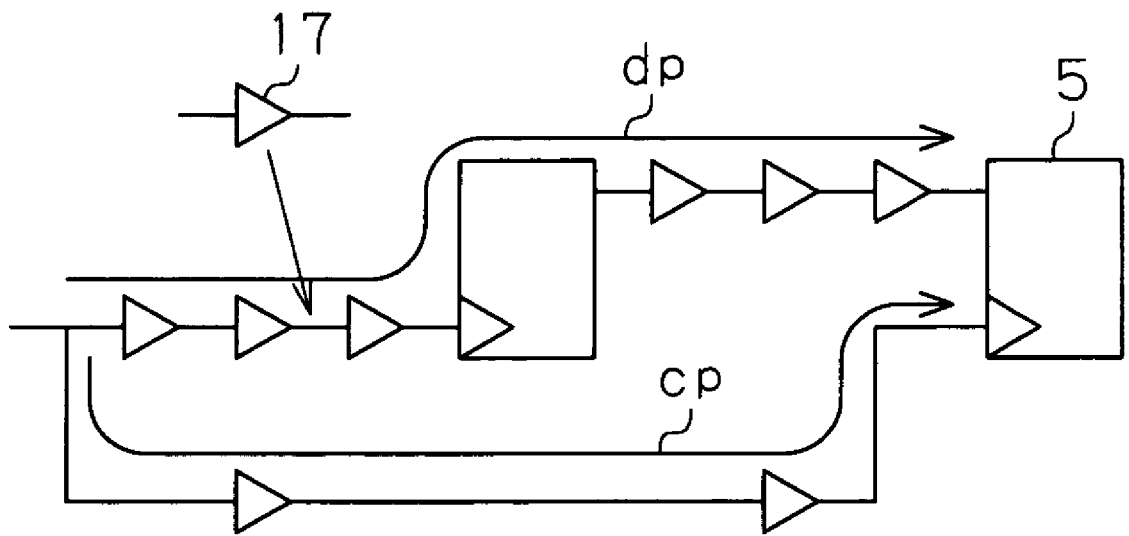
FIGS. 7A and 7B are block circuit diagrams illustrating the timing analysis method.
Figure 7B:
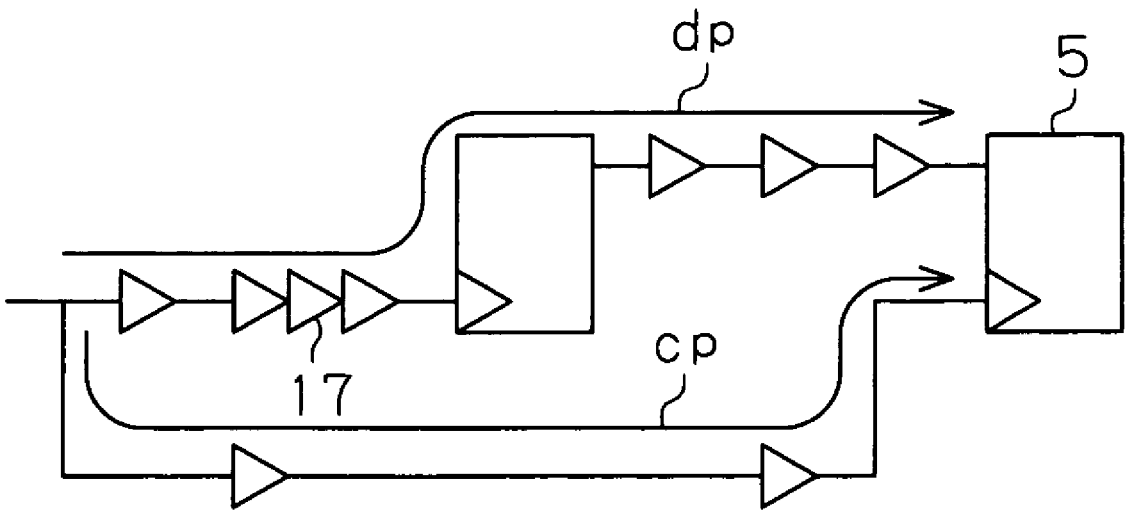

In the circuit of FIG. 7A, under the second corner conditions (low temperature, high voltage, and fast process), the net delay of the data path dp is 16 ps, the gate delay of the data path dp is 70 ps, the slack time of the flip-flop circuit 5 is 5 ps, the standard hold timing value is 30 ps, the net delay of the clock path cp is 30 ps, and the gate delay of the clock path cp is 20 ps. In this case, the hold margin for the flip-flop circuit 5 is 6 ps, as shown in equation 3. Thus, a timing error does not occur.

In the circuit of FIG. 7A, timing analysis is conduced under the third corner condition (high temperature, high voltage, and fast process), which is obtained by changing the temperature to a high temperature in the second corner condition (low temperature, high voltage, and fast process). The timing analysis is conducted by using equation 6 with each delay time under the second corner condition and the temperature characteristic coefficient.

In the third corner condition, the net delay of the data path dp is 25.6 ps, the gate delay of the data path dp is 77 ps, the slack time of the flip-flop circuit 5 is 11 ps, the standard hold timing value is 35 ps, the net delay of the clock path cp is 48 ps, and the gate delay of the clock path cp is 22 ps.

Under the third corner condition, the delay time of the data path is small as shown by equation 4. Thus, the hold margin is insufficient. Therefore, although the slack time of the flip-flop circuit 5 is 11 ps under the third corner condition, a buffer circuit of 5 ps is inserted into the data path dp as shown in FIG. 7B. As a result, the hold margin of the flip-flop circuit 5 is obtained from the following equation.

$$\text{Hold Margin} = 109.6 \text{ ps} - 70 \text{ ps} - 35 \text{ ps} = 4.6 \text{ ps} \quad \text{(equation 7)}$$

The insertion of the buffer circuit 17 increases the gate delay of the data path dp under the second corner condition from 70 ps to 75 ps. Thus, a timing error does not occur even if the slack time of the flip-flop circuit 5 is zero.

FIGS. 8A and 8B show an example of the layout correction performed in step S6. As shown in FIG. 8A, in a circuit in which buffer circuits 18a to 18c are connected, the net delay is large at section PL1. Thus a correction may be made to the circuit at section PL1 by replacing buffer circuit 18a with a buffer circuit 18d having a large drive capacity or by adding a buffer circuit 18e.

Further, as shown in FIG. 8B, when buffer circuits 19a to 19d are arranged close to each other, every two buffer circuits 19a to 19d are replaced by inverter circuits 20a and 20b. Such a replacement adjusts the net delay and gate delay so that a timing error does not occur.

The preferred embodiment has the advantages described below.

(1) Multi-corner timing analysis, in which the third and fourth corner conditions are added to the normal first and second corner conditions, is enabled.

(2) Timing analysis is enabled under the fourth and third corner conditions, which are respectively generated by reversing the temperature in the first and second corner conditions, with the gate delay, net delay, and temperature characteristic coefficients of the normal first corner condition and second corner condition.

(3) The automatic EC device 16 performs layout correction satisfying the hold margin and the slack time under the first to fourth corner conditions. This reduces inefficient iteration in comparison with the prior art.

As described above, the timing analysis method of the present invention reduces the timing analysis time while enabling the timing error elimination and layout correction.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A method for analyzing timing in a semiconductor integrated circuit device with multi-corner conditions including a best-case corner condition and a worst-case corner condition, wherein the best-case corner condition and the worst-case corner condition each include a temperature condition, with each temperature condition being one of a high temperature condition and a low temperature condition, the method comprising:

storing in a temperature characteristic coefficient table a temperature characteristic coefficient for each of temperature-reversed corner conditions that are generated by selectively reversing the temperature conditions of the best-case corner condition and the worst-case corner condition; and performing timing analysis under said temperature-reversed corner conditions based on a gate delay and net delay, which are calculated under the best-case corner condition and the worst-case corner condition, and the temperature characteristic coefficient.

2. The method according to claim 1, further comprising:
performing layout correction satisfying hold margin and slack time under each of the corner conditions after performing the timing analysis under said temperature-reversed corner conditions.

3. The method according to claim 2, wherein said performing layout correction includes inserting a buffer circuit at a section having a large net delay.

4. The method according to claim 2, wherein said performing layout correction includes replacing a buffer circuit in a section having a large net delay with a buffer circuit having a high load drive capacity.

5. The method according to claim 2, wherein said performing layout correction includes replacing two stages of buffer circuits with an inverter circuit.

6. A method for analyzing timing in a semiconductor integrated circuit device with multi-corner conditions including a first corner condition, which is a combination of a high temperature condition, a low voltage condition, and a slow process condition, and a second corner condition, which is a combination of a low temperature condition, a high temperature condition, and a fast process condition, the method comprising:

selectively reversing the temperature condition of the first corner condition to generate a fourth corner condition, which is a combination of the low temperature condition, the low voltage condition, and the slow process condition;

selectively reversing the temperature condition of the second corner condition to generate a third corner condition, which is a combination of the high temperature condition, the high voltage condition, and the fast process condition;

storing a temperature characteristic coefficient for the fourth corner condition and a temperature characteristic coefficient for the third corner condition in a temperature characteristic coefficient table;

performing timing analysis under the first corner condition and the second corner condition to calculate a gate delay and net delay under the first corner condition and a gate delay and net delay under the second corner condition; and performing timing analysis under the third corner condition and the fourth corner condition based on the gate delay and net delay in the first corner condition, the gate delay and net delay in the second corner condition, and the temperature characteristic coefficients stored in the temperature characteristic coefficient table.

7. The method according to claim 6, further comprising:

calculating the temperature characteristic coefficient from a ratio between a temperature characteristic of the first and second corner conditions and a temperature characteristic of the third and fourth corner conditions, and storing the temperature characteristic coefficient in the temperature characteristic coefficient table.

8. The method according to claim 6, further comprising:

performing layout correction satisfying hold margin and slack time under each of the corner conditions after performing the timing analysis under the third corner condition and the fourth corner condition.

9. The method according to claim 8, wherein said performing layout correction includes inserting a buffer circuit at a section having a large net delay.

10. The method according to claim 8, wherein said performing layout correction includes replacing a buffer circuit in a section having a large net delay with a buffer circuit having a high load drive capacity.

11. The method according to claim 8, wherein said performing layout correction includes replacing two stages of buffer circuits with an inverter circuit.

12. The method according to claim 6, wherein timing analysis is performed under the first to fourth corner conditions but not under other corner conditions.

13. An apparatus for analyzing timing in a semiconductor integrated circuit device with multi-corner conditions including a best-case corner condition and a worst-case corner condition, wherein the best-case corner condition and the worst-case corner condition each include a temperature condition, with each temperature condition being a high temperature condition or a low temperature condition, the apparatus comprising:

a timing list storing a delay characteristic of cells and conductive paths in the semiconductor integrated circuit;

a slack file storing slack time of the cell;

a temperature characteristic coefficient table storing a temperature characteristic coefficient for each of temperature-reversed corner conditions generated by selectively reversing the temperature conditions of the best-case corner condition and the worst-case corner condition; and an automatic timing engineering change device for performing timing analysis under said temperature-reversed corner conditions based on a gate delay and net delay, which are calculated under the best-case corner condition and the worst-case corner condition, and the temperature characteristic coefficient.

* * * * *